United States Patent [19]
Föttinger et al.

[11] Patent Number: 5,501,898
[45] Date of Patent: Mar. 26, 1996

[54] INTERIOR EQUIPMENT PART FOR VEHICLES

[75] Inventors: Walter Föttinger; Hansjörg Grimm, both of Weinheim; Gerhard Schaut, Hemsbach, all of Germany

[73] Assignee: Firma Carl Freudenberg, Weinheim, Germany

[21] Appl. No.: 112,822

[22] Filed: Aug. 25, 1993

[30] Foreign Application Priority Data

Aug. 26, 1992 [DE] Germany ............ 42 28 304.3

[51] Int. Cl.⁶ .................................. B32B 27/36
[52] U.S. Cl. .................. 428/287; 428/218; 428/224; 428/480
[58] Field of Search .................... 428/224, 287, 428/218, 480

[56] References Cited

U.S. PATENT DOCUMENTS 4,438,172  3/1984  Katsutoshi ............... 428/220
5,275,865  1/1994  Nicolay ................... 428/174

FOREIGN PATENT DOCUMENTS

| | | |
|---|---|---|
| 0317646 | 5/1989 | European Pat. Off. .. |
| 0363130 | 4/1990 | European Pat. Off. .. |
| 0377212 | 7/1990 | European Pat. Off. .. |
| 0394954 | 10/1990 | European Pat. Off. .. |
| 0469309 | 2/1992 | European Pat. Off. .. |
| 2738304 | 3/1979 | Germany . |
| 2937399 | 4/1981 | Germany . |
| 3314458 | 11/1983 | Germany . |
| 3629230 | 3/1988 | Germany . |
| 4041934 | 7/1992 | Germany . |

*Primary Examiner*—Patricia A. Short
*Attorney, Agent, or Firm*—Kenyon & Kenyon

[57] ABSTRACT

An interior equipment part for vehicles, in particular a support part for automobile roof linings, of single-layer or three-layer construction, such that the layer(s) exposed to the action of heat consist of 25–100% by weight of polybutylene terephthalate fibers and of at most 75% by weight of higher melting polyester fibers.

3 Claims, No Drawings

INTERIOR EQUIPMENT PART FOR VEHICLES

FIELD OF THE INVENTION

The present invention relates to interior equipment parts for vehicles, in particular a roof-lining support part. Support parts for automobile roof linings are the load-bearing components of automobile roof linings which are not on the visible side of the roof lining.

BACKGROUND OF THE INVENTION

A variety of constructions of interior equipment parts for vehicles are known in the art. A common difficulty in the case of such equipment parts, in particular in the case of freely suspended roof linings, is meeting the requirements that they be resistant to moisture and that they should be able to withstand high heat without sagging. In the case of insolation and also during enamelling at the manufacturing plant, the outer surfaces of such components are exposed to temperatures of up to 110° C. This must be borne in mind both in the case of the single-layer variety and in the case of three-layer nonwoven-laminates, the two outer layers of which must be made resistant to such temperatures.

Equipment parts of non-woven fabric which satisfy the above-mentioned requirements contain at least 50% by weight of polyester fiber up to consisting entirely of (100%) polyester fibers and achieve their heat resistance as a result of impregnation with thermosetting synthetic resin binder. Both single-layer and three-layer types are pressed into the intended shape under the action of pressure and heat and compacted (possibly with each other). This has been described for instance in DE 29 37 399 A1, in which case the resin binder is present preferably in a quantity of 400 g per square meter of area and approximately in the mm range of final thickness of the finished product. One proceeds in this connection to a final thickness of the finished product of preferably between 1 and 2.5 mm.

Additionally, DE 36 29 230 A1 describes the admixing of glass fibers up to a quantity of 100% by weight in order to further increase the heat resistance.

Such known equipment parts cannot be recycled due to their content of resin and/or glass fiber. In particular, it is not possible to remelt and regranulate the basic material, namely polyester fibers, either into low-value reusable polyester material or to obtain polyester of the same quality by regeneration via alcoholysis. This is not possible because the above-mentioned additional substances which provide the heat resistance cannot be adequately separated from the polyester portions before regeneration.

Furthermore, polyethylene terephthalate, which is customarily used as polyester fiber material in parts such as these, suffers structures drops of 90% of the room temperature starting value at realistically high temperatures of 90° C.

SUMMARY OF THE INVENTION

It is an object of the invention to provide an equipment part for vehicles, in particular a support part for automobile roof linings, which can be produced by simple conventional process steps and in which at least the fiber layers exposed to heat consist exclusively of polyester fibers and contain no binder resin, connective fibers or glass fibers.

It is a further object of the invention to provide such a part which exhibits a heat resistance which satisfies the requirements of the automobile industry, namely a modulus of elasticity upon bending according to the standard EN 63 of more than $30N/mm^2$, at a testing temperature of 90° C., a thickness of the material of 3 mm and a weight per unit of area of 1,000 $g/m^2$.

It is yet a further object of the invention to provide such a part which exhibits less loss of flexural strength at high temperatures than parts consisting of polyethylene terephthalate fibers.

It is another object of the invention to provide interior equipment parts for automobiles which are recyclable.

These and other objects of the invention are achieved by providing a 1–6 mm thick interior equipment part for vehicles, in particular a support part for automobile roof linings, of polyester fibers, the equipment part having a single-layer or three layer structure. All layers are pressed and compacted into the intended shape by the action of pressure and heat. According to the invention, all layers of the equipment part consist of polyester fibers having a titer of 1.5–30 dtex. This is essential in order to obtain a bonding of the fibers upon manufacture, thereby assuring the desired stability without the use of additional binders.

DETAILED DESCRIPTION OF THE INVENTION

According to the invention, the fiber layers which are critical with respect to the action of the heat contain polybutylene terephthalate fibers. In the case of the single-layer part, the single layer itself, and in the case of the three-layer version, the two outer layers, contain polybutylene terephthalate fibers. The single-layer version of the invention should consist of 80–100% by weight of polybutylene terephthalate fibers and at most 20% by weight—in homogeneous distribution—of polyester fibers having a melting point above 228° C. In the case of the three-layer version, the two outer layers which are exposed to the action of heat, consist in each case of 25–100% by weight of polybutylene terephthalate fibers and at most 75% by weight—in homogeneous distribution—of polyester endless fibers having a melting point above 228° C.

The total of the two fiber weight components is always 100%; i.e., there are no further binder or solidification additives. The equipment part consists exclusively of polyester.

In the case of the three-layer type of equipment part, the center layer which is not exposed to much heat, can consist of a mixture of about equal portions of polyethylene terephthalate fibers and bi-component fibers consisting of polyethylene terephthalate and a copolyester of lower melting point. Fiber titer and staple length are again equal to that of the fibers in the other layers.

In one preferred variant, this inner layer's density is approximately 8% to 40% of that of the outer layer. This parameter increases the flexural strength of the composite structure; smaller densities prevent the transmission of deformation forces from one outer layer to the other while higher values than those indicated have a detrimental effect on the overall weight without improving the flexural strength.

Since this central layer is supported and partially insulated by the two outer fiber layers, its heat resistance is of less importance for the quality of the equipment parts; this quality is determined exclusively by the layers containing the polybutylene terephthalate fibers.

It was not possible to foresee that without the use of additional binding components that one could nevertheless arrive at a fiber structure which can be shaped and compacted under the action of pressure and heat which would satisfy the requirements set forth above. An additional benefit of the invention is that objects manufactured according to the invention can be of lighter weight than would be the case if, in addition, considerable quantities of binder, connective fibers and/or heat resistant resins or fibers were to be added.

Surprisingly, the interior equipment part of the invention has a higher heat resistance than a part based exclusively on polyethylene terephthalate fibers. This could not be expected for the reason that the second order transition temperature point, i.e. the temperature at which the material starts to soften, is about 39° C. for polybutylene terephthalate but it is about 69° C. for polyethylene terephthalate. This proves that this strength could not be predicted on basis of known thermal values.

In the present invention it is to be understood that "polybutylene terephthalate fibers" also refers to core/shell fibers whose core consists of a polyester which must merely satisfy the requirement that its melting range is above that of the polybutylene terephthalate which forms the shell of the fiber. The use of such multi-component fibers in the manufacture of equipment parts in accordance with the invention still assures residual values for the flexural stiffness of 35–40% at 90° C. These values are sufficient, in most cases, to prevent any disturbing sagging upon the action of heat. The structural parts can be shaped very easily and the use of these bi-component fibers is cost efficient.

The manufacture of the equipment part employs essentially the following process steps and sequences.

A treatment in the preheating furnace, where heated metal plates which have a polytetrafluorethylene coating, act on the binding fibers. The temperature of the plates should in this case be 1°–15° C. above the melting point of the polybutylene terephthalate (228° C.). Dwell times of 1–5 minutes are advisable.

In a further stage, the non-woven fabric is brought into a molding tool which corresponds to the finished equipment part shape and it is exposed to a molding pressure of $10^5$ to $2 \times 10^6$ Pa. The temperature of the molding tool is advisedly at least 10° C. below the melting temperature of the polybutylene terephthalate. The dwell time is 0.2 to 2 minutes, whereupon the finished equipment part can be removed from the mold.

It was not to be expected that by using polybutylene terephthalate fibers in accordance with the invention it would be possible without any addition of low-melting point binding fibers, other binding agents, resins, or glass fibers, to produce stiff and at the same time elastic molded parts which at 90° C. would still have a flexural stiffness of up to 33% of the starting value. Evidently, the polybutylene terephthalate alone results in a strengthening of the fibers up to the inside of the layer in question provided the titer and the staple lengths of the fibers claimed are maintained.

The advantages of the invention will be explained in greater detail below by way of example.

EXAMPLE 1

A single-layer nonwoven consisting entirely of commercially available polybutylene terephthalate fibers having a titer of 1.7 dtex and a cutting length of 38 millimeters was produced by carding and conventional needling. The weight per unit area of the needled nonwoven obtained in this manner was 800 g/m$^2$, its thickness 22 mm, and the number of needle stitches was 18/cm$^2$.

The material was then preheated and pre-compacted between two heated plates coated with polytetrafluorethylene. The upper plate had a temperature of 235° C., the lower one of 238° C. and the distance between both plates was 7 mm.

The material which was exposed to the above mentioned conditions for a time of 2.2 minutes, was immediately afterwards compressed for a pressing time of 1 minute to a thickness of 3 mm between two plates of room temperature. The completely compressed material was subjected to a flexural stiffness test according to EN 63 at 23° C. and 90° C. The residual value of the flexural stiffness at 90° C. was in this case still 33%. This value is sufficient for an automobile roof lining not to sag substantially upon the action of a corresponding temperature. The lightweight of the structural part also contributes to this.

EXAMPLE 2

A three-layer composite nonwoven was produced from spunbonded nonwovens. The cover layers consisted in each case of 70% by weight of polyethylene terephthalate fibers and 30% by weight polybutylene terephthalate fibers having a titer in each case of 7 dtex. The thickness of the outer layers was in each case 0.7 mm and their weight per unit area 250 g/m$^2$.

The central layer consisted of a spunbonded nonwoven of a thickness of 3 mm which had a weight of 500 g/m$^2$ and was needled on both sides. It was formed of the same fiber material in the same proportions as in the outer layers. The fiber titer was 5.6 dtex.

The composite was thereupon precompacted to 4 mm between two plates coated with polyethylene terephthalate and heated to a temperature of 255° C. The material which was exposed to the above-mentioned conditions for a period of 2.5 minutes, was immediately afterwards compressed to a thickness of 3 mm for a period of 1 minute between two plates at room temperature.

The finished material was subject to a flexural stiffness test according to the standard EN 63 at 23° C. and 90° C. The test values are set forth in the table below.

EXAMPLE 3

In the case of this variant, which also had three layers, there were used outer layers according to Example 2, while a thermally pre-compacted needled nonwoven of polyethylene terephthalate fibers was used for the central layer. This needled nonwoven which had a thickness of 18 mm and a weight of 500 g/m$^2$, consisted of 100% by weight of bi-component fibers having a titer of 6 dtex and a staple length of 60 mm. The core of the bi-component fibers consisted of stretched polyethylene terephthalate having a melting temperature of 260° C. and the shell consisted of a copolyester having a melting temperature of 200° C.

The three-layer composite was pre-compacted to 5 mm within 0.5 minute between 2 heated plates coated with polytetrafluorethylene and having a temperature of 255° C.

This material was then compressed between two plates at room temperature to a thickness of 3 mm for a pressing time of 1 minute and a pressing pressure of 500,000 Pa.

The flexural stiffness is set forth in the table below.

EXAMPLE 4

A single-layer of nonwoven of 100% core/shell fibers was produced, the core consisting of a polyester which melts at a higher melting point than the shell which consists of polybutylene terephthalate of the shell. This fiber is commercially available and has a titer of 5.5 dtex at 55 mm cutting length. The production was effected by carding and conventional needling.

The weight per unit area of the needled nonwoven obtained in this manner was 800 g/m², its thickness 22 mm and the number of needle stitches was 18/cm.

This nonwoven was then pretempered at 235° C. for six minutes in a belt dryer.

The material was then preheated and pre-compacted between two heated plates coated with polytetrafluoroethylene. The temperature of the two plates was 255° C. and the distance between the plates was calibrated at 8 mm.

The material which was exposed to the above mentioned conditions for a period of 2.4 minutes, was immediately afterwards compressed to a thickness of 4 mm for a pressing time of 1 minute between two plates of room temperature. The completely compressed material was subjected to a flexural stiffness test according to EN 63 at 23° C. and 90° C. The residual value of the flexural stiffness at 90° was in this case still 38.8%. This value is sufficient for an automobile roof lining not to sag substantially upon exposure to a corresponding temperature. The light weight of the structural part also contributes to this.

COMPARATIVE EXAMPLE

By way of comparison, a needled nonwoven of conventional polyethylene terephthalate fibers of the following description was produced:

A three-layer nonwoven laminate without the addition of binder and synthetic resin was produced analogous to Example 2 by carding, needling, and thermal pre-compacting, treated in a preheating furnace for three minutes at a circulating air temperature of 170° C. and thereupon shaped in the molding tool at 5×10⁵ Pa for a period of 1.5 minutes. The temperature was in this case 120° C.

The outer layers consisted in each case entirely of 6 dtex-bi-component fibers having a staple length of 60 mm and a core of stretched polyethylene terephthalate, melting temperature 260° C., and of a shell of copolyester with a melting point of 200° C. The fibers were obtained commercially.

The central layer was composed of 80% by weight of the above mentioned core-shell fibers and 10% by weight of simple stretched polyethylene terephthalate fibers having a titer of 17 dtex and 10% by weight of stretched polyethylene terephthalate fibers having a titer of 6 dtex. The flexural stiffness of the material was then determined according to EN 63 at 23° C. and 90° C.

As shown by the comparison, the flexural stiffness dropped for the material of polyethylene terephthalate fibers at 90° C. to 10% of the starting value at room temperature. Such a value is no longer tolerable and an automobile roof lining would, under these conditions, sag in the vehicle and be qualitatively useless.

The following table again summarizes the results obtained by the examples:

| | MODULUS OF ELASTICITY AT FLEXURE (N/mm²) ACCORDING TO EN 63 Weight Per Unit Area 1000 g/m², Thickness 3 mm | | |
|---|---|---|---|
| Example | 23° C. | 90° C. | %-Residual Value |
| 1 | 130 | 43 | 33 |
| 2 | 363 | 94 | 26 |
| 3 | 177 | 62 | 35 |
| 4 | 322 | 125 | 39 |
| Comparison | 136 | 14 | 10 |

What is claimed is:

1. An interior equipment part for a vehicle comprising a heat and pressure compacted laminate of a first outer layer of polyester fibers for exposure to heat, a second outer layer of polyester fibers for exposure to heat, and an inner layer of polyester fibers sandwiched between said first and second outer layers, each of the first and second outer layers and the inner layer consisting essentially of polyester fibers having a titer of 1.5–30 dtex, where from 25% to 100% by weight of each of the first and second outer layers consists of polybutylene terephthalate fibers and where each of the first and second outer layers contains from 0% to 75% by weight of homogeneously distributed polyester endless fibers having a melting point greater than 228° C., wherein the inner layer has a density which is 8–40% of a density of the outer layers, and the heat and pressure compacted laminate having a thickness of from 1 mm to 6 mm.

2. The interior equipment part according to claim 1 wherein the polybutylene terephthalate fibers comprise a core portion and a shell portion and wherein the core portion consists of a polyester having a higher melting point than the shell portion.

3. A support structure for an automobile roof lining comprising the part of claim 1.

\* \* \* \* \*